Oct. 10, 1967  E. W. SCHMIDT  3,345,953
FLOOR TRUCK FOR TOW LINE SYSTEM
Filed Nov. 19, 1965  3 Sheets-Sheet 2
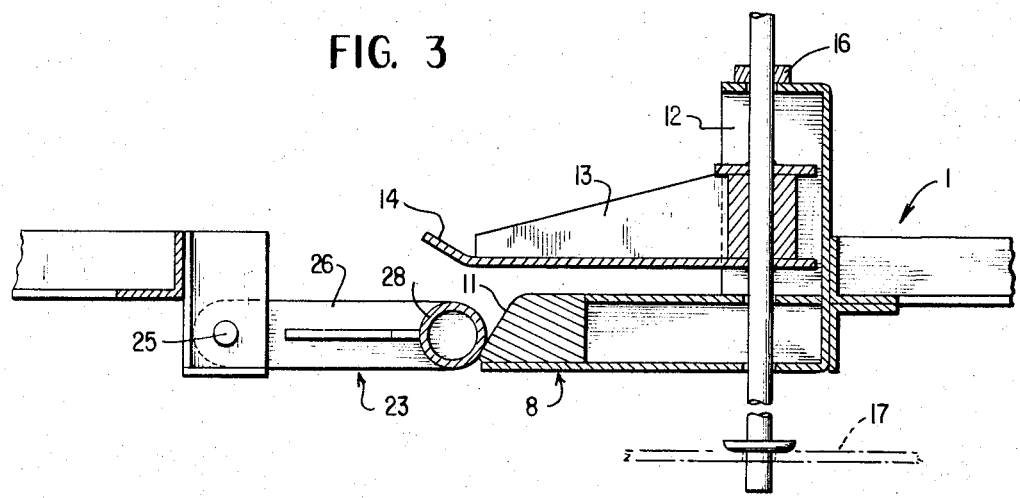
FIG. 3
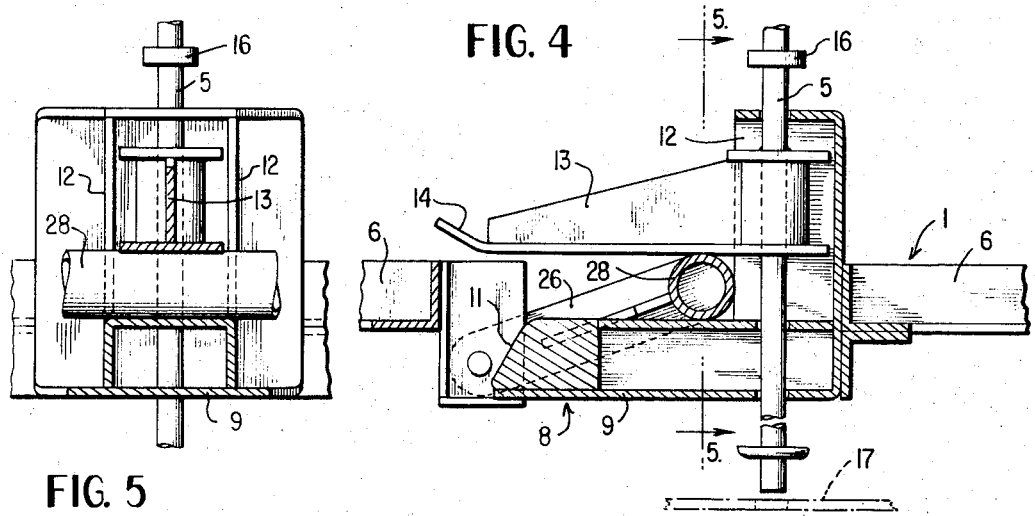
FIG. 4
FIG. 5
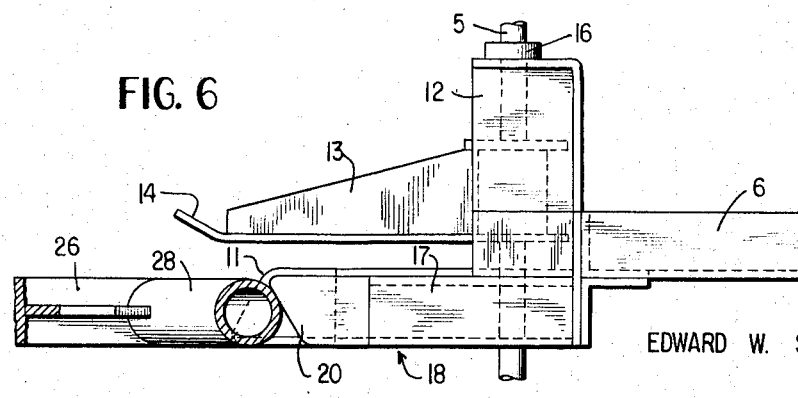
FIG. 6
INVENTOR
EDWARD W. SCHMIDT Oct. 10, 1967  E. W. SCHMIDT  3,345,953
FLOOR TRUCK FOR TOW LINE SYSTEM
Filed Nov. 19, 1965  3 Sheets-Sheet 3
FIG. 7
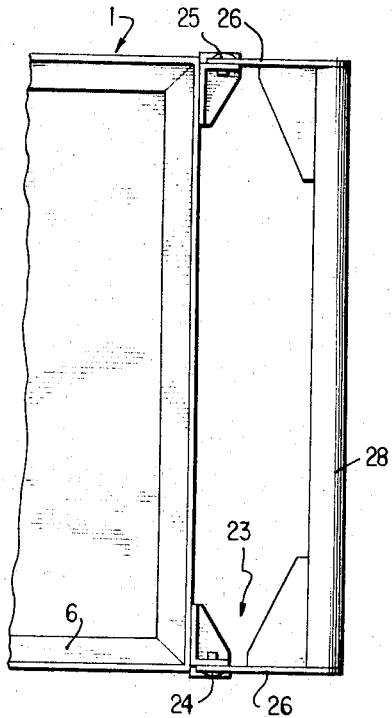
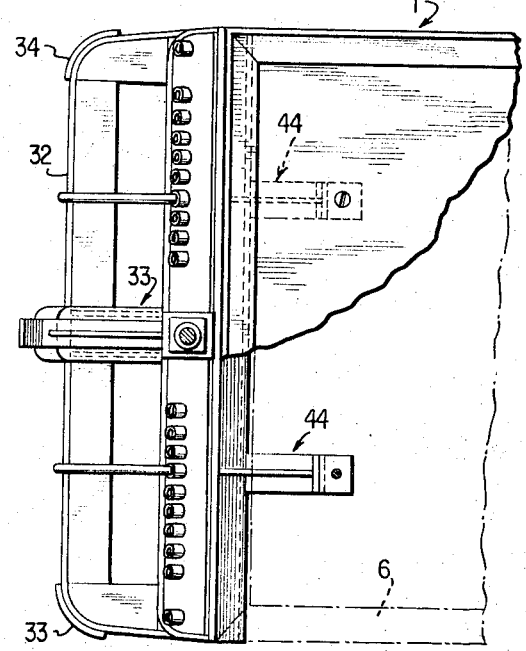
FIG. 8
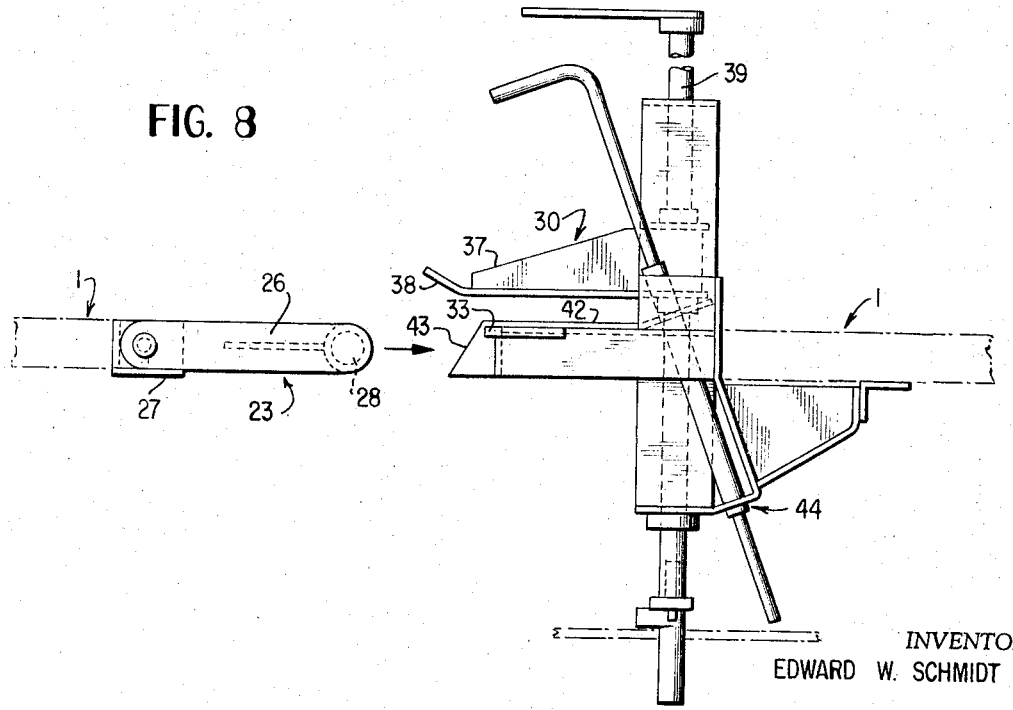
INVENTOR
EDWARD W. SCHMIDT

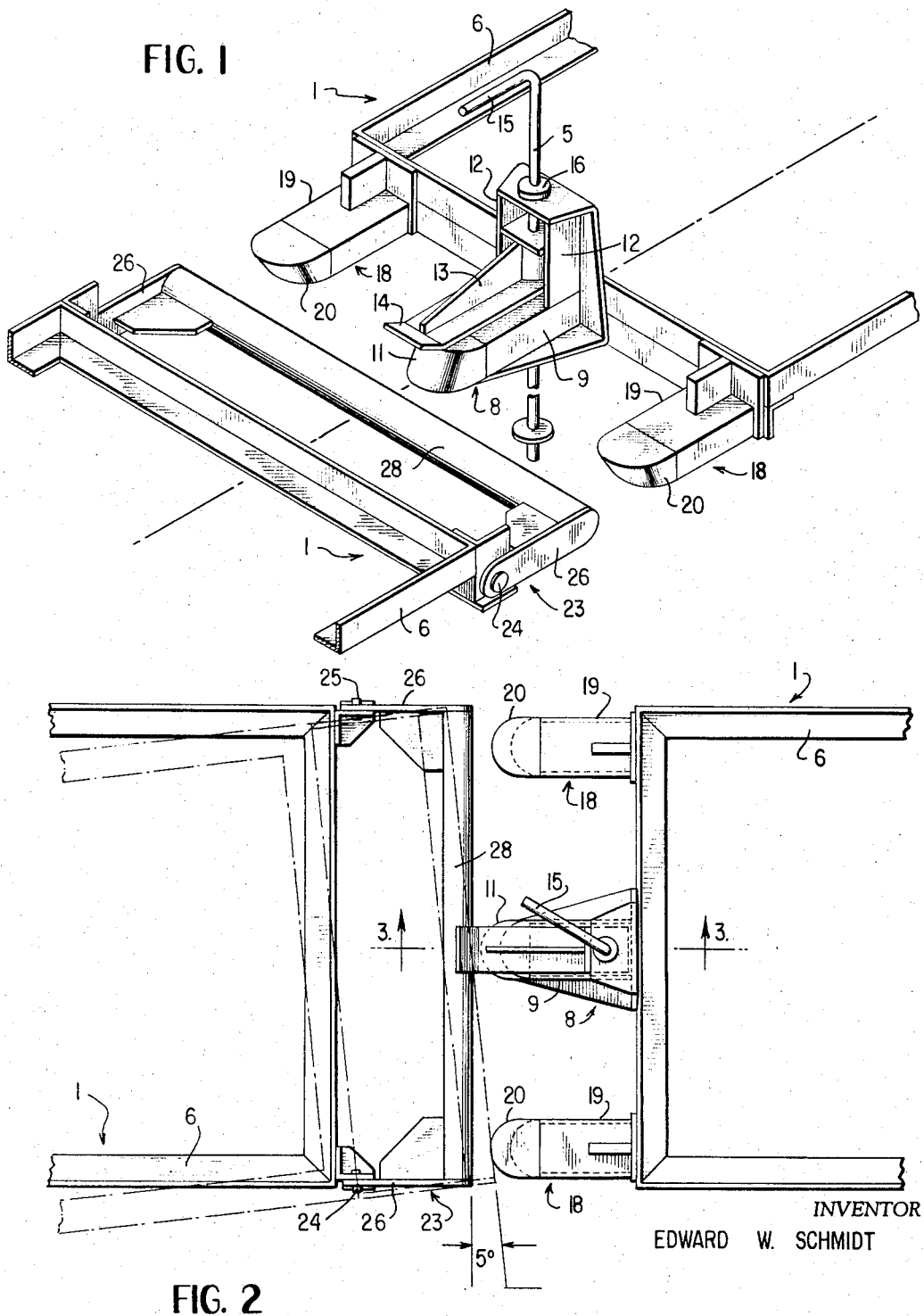

United States Patent Office 3,345,953
Patented Oct. 10, 1967

3,345,953
FLOOR TRUCK FOR TOW LINE SYSTEM
Edward W. Schmidt, Chicago, Ill., assignor to Link-Belt Company, a corporation of Illinois
Filed Nov. 19, 1965, Ser. No. 508,780
5 Claims. (Cl. 104—170)

This invention relates to the art of tow truck systems such as employed in warehouses, freight terminals and the like. More specifically the invention involves an improved floor truck for such systems having particular utility at a junction between a main and spur line of a tow truck system enabling trucks diverted on to the spur line to be pushed through the junction by the following truck, while providing for the disengagement of the truck from the tow line by the preceding truck when it is desired to accumulate trucks in a straight line section of the main line.

Floor trucks of the present invention are the type which are moved along the warehouse floor by a tow line which may be enclosed in a slot in the floor of the warehouse. These under-the-floor tow lines have propelling dogs attached thereto which engage with a driving pin attached to the truck and extending through the slot in the floor. Generally such systems have powered main tow lines in a guide slot with the propelling dogs moving along therein. Such tow truck systems also have spur lines which "non-powered," meaning that there is no propelling dog or tow line for dragging the drive pin of a diverted floor truck once the truck has moved off of the main line and on to the spur line. These spur lines are used to divert the trucks from the main line at desired selected points for loading or unloading. Power for propelling a diverted truck through the junction of the main line and on to the spur line is frequently supplied from the main line propelling member through the intermediary of a truck following the one being diverted, such following truck pushing the diverted truck through the junction and onto the spur line. These systems are sometimes described as incorporating "bump-off switching."

In presently available systems, safety bumpers may be provided on each floor truck to enable a number of such trucks to be accumulated at a given point on the main line. These bumpers generally operate upon engagement with an obstruction such as a stalled preceding floor truck to move the driving pin, which extends downwardly through the guide slot in the floor from an operative to an inoperative position. In the inoperative position the driving pin is disengaged from the propelling dogs on the tow line and the truck comes to a halt. By stopping one truck at a desired point, the operator may accumulate any number of trucks at that point. However, with a so-called "bump-off switching" system, a bumper which releases the floor truck from the tow line propelling dog when encountering any object in its path is not acceptable since upon striking a diverted truck to push it off onto the spur line, the bumper would disengage the driving pin, thereby stopping both trucks.

In prior systems having safety bumper trucks it has been necessary to make special provisions when the "bump-off" system is to be used and avoid the safety bumper of a following truck from releasing the driving pin of such truck. Specially located floor mounted cams have been proposed to inactivate the release for the floor truck driving pin at the appropriate positions. This approach, of course, raises the cost of the entire system.

It is a principal object of the present invention to provide an improved floor truck for a tow line system usable to enable both bump-off switching and accumulation of trucks on a straight length of the main line without the necessity of providing special modifications of the warehouse floor or tow line facilities.

A further object of the present invention is to provide a simple, inexpensive floor truck bumper construction produced with a minimum of moving parts and which is rugged and reliable in its operation with "bump-off switching" and straight line truck accumulation.

Generally, the invention comprises a material handling floor truck for use with a tow truck system comprising a vehicle body having a rear bumper extending across a substantial portion of the width of said body, a driving pin connected to said vehicle body vertically movable from an operative to an inoperative position, said driving pin in said operative position being disposed to engage a tow line to propel said truck, said driving pin in said inoperative position being located so as to be out of engagement with the tow line, disengaging means for moving said driving pin from said operative to said inoperative position, said disengaging means being generally centrally located at the front of said vehicle body so as to be activated to move said driving pin to said inoperative position when said truck strikes the rear bumper of a preceding material handling truck, preventing means at the front of said truck spaced laterally at each side of said disengaging means engageable with the rear bumper of a preceding truck to prevent said bumper from operating said disengaging means when the angle between the longitudinal centerlines of two succeeding trucks exceeds a predetermined angle.

Other preferred features and advantages of the present invention will appear from the following description of representative embodiments thereof, disclosed in the accompanying drawings in which:

FIGURE 1 is a perspective view of the front and rear bumper components of the invention which are associated with a leading and following floor truck;

FIGURE 2 is a plan view of the components of FIGURE 1 shown in operating relationship;

FIGURE 3 is an enlarged sectional view taken at line 3—3 of FIGURE 2;

FIGURE 4 is a view similar to FIGURE 3 with the bumper components of the two trucks in a fully interengaged position;

FIGURE 5 is a sectional view taken at line 5—5 in FIGURE 4;

FIGURE 6 is a side elevational view partially in section showing the bumper components of the two trucks in the interengaged position represented by the broken line showing of FIGURE 2;

FIGURE 7 is a plan view of another embodiment of the invention; and

FIGURE 8 is a side elevational view of the bumper components of the FIGURE 7 embodiment.

Referring first to FIGURE 1, the material handling floor truck is generally indicated at 1. In showing the two embodiments of the invention the rear portion of one truck and the front portion of a following truck are illustrated. Each truck has the usual vehicle body comprised of a frame 6, which supports the material carrying platform, the body being mounted on floor engaging wheels (not shown). The material handling truck also has a driving pin 5 for connection with the propelling dogs on the usual tow line that is enclosed within a slot in the warehouse floor. The material handling truck 1 carries at the forward end of vehicle body frame 6 a disengaging means 8 associated with driving pin 5 to raise it to inoperative position out of engagement with the propelling dog on the tow line under certain conditions which will be described. This disengaging means 8 comprises a central extension 9 fixedly attached to frame 6. The front face 11 of this central extension 9 is sloped from the bottom upwardly toward the frame 6 as shown most clearly in FIGURES 3 and 4. Extending upwardly on either side of the extension 9 are guide plates 12. Within the space formed between these two guide plates is a trip member 13. Trip member 13 has a front edge 14 which slopes from the top downwardly toward the frame 6. Trip member 13 is attached to driving pin 5 so that when member 13 moves upwardly it carries driving pin 5 along with it. A guard collar 16 is secured to pin 5 above guide plates 12, this collar limiting downward movement of pin 5 so that the driving pin 5 passes through the slot in the floor 17 and is engaged by the propelling dog attached to the under floor tow line as well known in tow truck systems. Driving pin 5 has a handle 15 for manually moving the driving pin out of engagement with the propelling dog whenever desired.

A preventing means 18 to render disengaging means 8 inoperative is attached to each side of frame 6 adjacent the lateral front corners of the truck body. This preventing means 18 comprises an extension 19 having an overhanging abutment in the form of a downwardly sloping front face 20. Extensions 19 as shown in FIGURES 2 and 6 are slightly shorter than the central extension 9 so that a line intersecting the face 11 and one of the faces 20 forms about a 5° angle with respect to the longitudinal center line of the truck frame 6. Face 20 of extension 19 slopes from the bottom upwardly away from the frame 6 in the opposite direction from the slope of face 11.

Each material handling truck 1 has a rear bumper 23 extending across the rear width of the truck. This bumper 23 is hingedly attached to frame 6 at 24 and 25, the bumper being comprised of a pair of spaced side arms 26 with a tubular bumper bar 28 extending therebetween. The pivotal connections 24 and 25 permit the rear bumper 23 to swing upwardly as shown in FIGURE 4 while abutments 27 beneath each arm 26 prevent the bumper from swinging downwardly holding it in a normal horizontal position generally in the plane of disengaging means 8 and preventing means 18 carried on the forward end of the truck vehicle body as shown in FIGURES 3 and 6.

The operation of the embodiment hereinbefore described may best be explained by referring to FIGURES 3 and 4 which illustrate the operation of the bumper components when two trucks 1 are both on a straight section of main tow line track. FIGURE 1 shows the relationship that a leading truck and a following truck will normally have while the trucks are being towed along the system. When the following truck approaches a leading truck, which is stationary, the tubular bumper bar 28 of the lead truck strikes the sloping front face 11 of the disengaging means 8. This sloping front face forces the hinged bumper 23 up whereupon as the two trucks continue to come together while the driving pin 5 of the following truck is still engaged with the tow line propelling dog, the bar 28 comes into contact with the trip member 13. The bumper bar 28 then slides along the top surface of the extension 9 until it comes into contact with the front edges of guide plates 12. Bumper bar 28 is so proportioned that when it is pressed between the trip member 13 and the central extension 9, as shown in FIGURE 4, the driving pin 5 is raised to be out of engagement with the tow line propelling dog, and the truck will no longer be driven and thus will come to a halt. This is the condition as shown in FIGURES 4 and 5.

It will be appreciated that with the two trucks in a straight line path of movement as shown in solid lines on FIGURES 1 and 2, the bumper bar 28 is perpendicular to the longitudinal axis of the trucks and to the straight path of movement. In these circumstances bumper bar 28 first engages and is raised by sloping front face 11 of disengaging means 8 before it can engage either of the downwardly sloping faces 20 on the two preventing means 18 that are spaced laterally of the centrally positioned disengaging means 8.

The sloping front edge 14 of the trip member 13 serves to prevent the bumper bar 28 from bouncing over the top of trip member 13 upon striking and moving up the face 11.

When trucks are to be switched into non-powered spurs deviating from the main powered tow line, the leading truck to be switched into the spur comes to a stop with its tow pin 5 in the spur line slot but disengaged from the tow line propelling dog. As so located this lead truck is somewhat out of parallelism with the main line and must be pushed fully onto the spur by the following truck to allow following trucks to continue on the main tow line past this particular spur or to switch additional trucks off the main tow line onto this particular spur.

With the usual magnitude of curvature of the spur from the main tow line, a truck switched onto a spur will be a minimum of five degrees out of parallel with the main line. Thus the lead truck going onto the spur at least will be in a position as shown by the broken lines on FIGURE 2 relative to the longitudinal axis of the next following truck. In this position bumper bar 28 of hinged bumper 23 will contact the face 20 of preventing means 18 before contacting the upwardly sloping face 11 of disengaging means 8. This face 20 is downwardly inclined so that it will hold the hinged bumper 23 in its down horizontal position and prevent it from being forced upward by the face 11 of the center projection 9 on disengaging means 8. The driving pin 5 of the truck will therefore not be raised but will remain in contact with the propelling dog on the tow line and the truck will be pulled through the junction pushing the lead truck clear of the main line onto the spur. It will be seen that as long as the angle between the axes of two succeeding trucks is greater than the above mentioned 5° minimum where the lead truck stalls as by being disengaged with the tow line propelling dog, a corner of the rear bumper of this lead truck will engage beneath the downwardly sloping face 20 of one of the preventing means 18 on the following truck and thereby held down so that the following truck pushes the lead truck off onto the spur.

Referring now to FIGURES 7 and 8 which illustrate another embodiment of the invention, a continuous front bumper 32 has lips 33 and 34 on the lateral corners theremeans 18 as described on the first embodiment. This bumper 32 has lips 33 and 34 on the lateral corners thereof which form overhanging abutments and serve the same purpose as the downwardly sloping faces 20 of the first embodiment. Thus lips 33 and 34 provide overhanging abutments like faces 20 which hold the hinged bumper bar 28 down in a horizontal position when two succeeding trucks are out of alignment and the following truck is to push the lead truck off onto a spur. A disengaging means 30 contains a trip member 37 with a sloping front face 38. This trip member is attached to the driving pin 39 in the manner described for the embodiment of FIGURES 1–6. Disengaging means 30 also comprises a center projection 42 with an upwardly sloping front face 43 as in the embodiment of FIGURES 1–6.

The embodiment of FIGURES 7 and 8 also shows an indexing means 44 which is used to automatically divert the trucks on predetermined spurs at predetermined points throughout the system. The operation of this indexing means and its switching functions forms no part of the present invention and therefore need not be described herein.

The embodiment of FIGURES 7 and 8 operates in a manner similar to the manner of the operation heretofore described for the embodiment of FIGURES 1–6. When two succeeding trucks are on the main straight tow line with their centerlines in line, if the lead truck stalls or becomes unpowered, hinged bumper 23 will strike sloping face 43 on the disengaging means 30 of the following truck and slide along the upper face of center projection 42 between the projection 42 and the trip member 37. This raises the trip member and consequently driving pin 39 out of engagement with the propelling dog on the tow line, thereby causing the following truck to also come to a stop. When the lead truck is being diverted onto a spur, its centerline will be 5° or more out of alignment with the main tow line track, and at least this far out of alignment with the centerline of the next following truck. When so positioned, upon the lead truck stopping, bumper bar 28 will strike the outside corner of the front bumper 32 on the following truck, engaging beneath one of the corner lips 33 or 34 on the front bumper 32. Thus the hinged bumper 23 will be held downwardly in a horizontal position by either lip 33 or lip 34. With the hinged bumper held in this position, the driving pin 39 will not be raised but will continue to be engaged with the propelling dog of the tow line and the following truck will push the lead truck through the junction onto the spur and clear the main line.

While preferred embodiments have been described above in detail, it will be understood that numerous ramifications and modifications may be resorted to without departing from the scope of the invention as defined in the following claims.

What is claimed is:

1. A material handling floor truck for use with a tow truck system comprising a vehicle body having a rear bumper extending across a substantial portion of the width of said body,
   a driving pin connected to said vehicle body vertically movable from an operative to an inoperative position, said driving pin in said operative position being disposed to engage a tow line to propel said truck, said driving pin in said inoperative position being located so as to be out of engagement with the tow line,
   disengaging means for moving said driving pin from said operative to said inoperative position, said disengagng means being generally centrally located at the front of said vehicle body so as to be activated to move said driving pin to said inoperative position when said truck strikes the rear bumper of a preceding material handling truck,
   preventing means at the front of said truck spaced laterally at each side of said disengaging means engageable with the rear bumper of a preceding truck to retain said bumper against moving into engagement with said disengaging means and prevent said bumper from operating said disengaging means when the angle between the longitudinal centerlines of two succeeding trucks exceeds a predetermined angle.

2. A material handling floor truck as recited in claim 1 wherein said rear bumper is hingedly connected to said vehicle body, and has a normal position projecting rearwardly of said vehicle body, and said preventing means comprises an overhanging abutment adjacent the front of said vehicle body at each side of said disengaging means, said abutments being disposed at a level to overhang and hold said rear bumper of a preceding truck down in said normal position when the angle between the longitudinal centerline of two succeeding trucks exceeds a predetermined angle.

3. A material handling floor truck is recited in claim 1 wherein said rear bumper is hingedly connected to said vehicle body, and said disengaging means comprises a trip member vertically reciprocable with respect to said vehicle body attached to said driving pin, said disengaging means further comprising a central projection fixed to said vehicle body having an upwardly sloping front face thereon, and said central projection being located at a level whereby it will contact the hinged rear bumper of the preceding truck when two succeeding aligned trucks engage each other whereby said sloping face of said central projection raises said hinged bumper into contact with said trip member thereby disengaging said driving pin.

4. A material handling floor truck as recited in claim 3 wherein said preventing means comprises a pair of side projecting means shorter than said central projecting means on each front side of said vehicle body, each said side projecting means having a downwardly sloping front face whereby when two succeeding unaligned trucks engage each other said preventing means comes into contact with the hinged bumper of the lead truck and said sloping face of said preventing means holds said hinged bumper from being moved upwardly.

5. A material handling floor truck as recited in claim 3 wherein said preventing means comprises a pair of projecting lips on a continuous front bumper of said material handling truck, said continuous front bumper being disposed rearwardly of the outer sloping face of said projecting means, said lips being located adjacent the outside corner portions of said continuous bumper and positioned so that when said outside corner portions of said continuous bumper on a following truck come into contact with the hinged rear bumper of a leading truck, said lips prevent said hinged bumper from moving upwardly.

No references cited.

ARTHUR L. LA POINT, *Primary Examiner.*

D. F. WORTH, *Assistant Examiner.*

UNITED STATES PATENT OFFICE
CERTIFICATE OF CORRECTION

Patent No. 3,345,953　　　　　　　　　　　　　　　October 10, 1967

Edward W. Schmidt

It is hereby certified that error appears in the above numbered patent requiring correction and that the said Letters Patent should read as corrected below.

Column 1, line 27, after "which" insert -- are --; column 4, line 38, for "has lips 33 and 34 on the lateral corners there-" read -- replaces the projections 19 of the preventing --.

Signed and sealed this 29th day of October 1968.

(SEAL)
Attest:

Edward M. Fletcher, Jr.　　　　　　　　　　　　　EDWARD J. BRENNER
Attesting Officer　　　　　　　　　　　　　　　　Commissioner of Patents